2/2/88 XR 4,723,072

United States Patent [19]

Naruse

[11] Patent Number: 4,723,072

[45] Date of Patent: Feb. 2, 1988

[54] APPARATUS FOR DISCRIMINATING SHEETS

[75] Inventor: Kazuaki Naruse, Kawasaki, Japan

[73] Assignee: Kabushiki Kaisha Toshiba, Kawasaki, Japan

[21] Appl. No.: 688,989

[22] Filed: Jan. 4, 1985

[30] Foreign Application Priority Data

Jan. 11, 1984 [JP] Japan .... 59-2047
Jan. 11, 1984 [JP] Japan .... 59-2049
Feb. 7, 1984 [JP] Japan .... 59-19333
Feb. 7, 1984 [JP] Japan .... 59-19334

[51] Int. Cl.⁴ .... G06K 7/10; G01N 21/86

[52] U.S. Cl. .... 235/454; 209/534; 235/379; 250/559; 250/556; 250/562; 356/71

[58] Field of Search .... 209/534; 235/454, 379; 356/71; 250/559, 223 R, 556, 562

[56] References Cited

U.S. PATENT DOCUMENTS 4,189,235 2/1980 Guter et al. .... 250/562 X
4,352,988 10/1982 Ishida .... 250/559
4,429,991 2/1984 Williams .... 356/71 X
4,516,031 5/1985 Kaule et al. .... 209/534 X
4,587,434 5/1986 Roes et al. .... 250/556

FOREIGN PATENT DOCUMENTS 79163 5/1983 European Pat. Off. .
3043675 6/1981 Fed. Rep. of Germany .
2932962 4/1982 Fed. Rep. of Germany .
963586 7/1964 United Kingdom .
859101 1/1981 United Kingdom .

*Primary Examiner*—David L. Trafton
*Attorney, Agent, or Firm*—Cushman, Darby & Cushman

[57] ABSTRACT

A bank note discriminating apparatus has a detector for detecting light reflected by or transmitted through a bank note upon irradiation of light while the bank note is being conveyed, and a judging circuit for integrating a reflected light signal from the detector to obtain an amount of light reflected by the bank note and for comparing the amount with a reference signal so as to discriminate a fit note from an unfit note. The apparatus further comprises a timing signal generator for generating printed and non-printed region signals in response to the transmitted light signal from the detector in accordance with the types of bank notes, an integrator circuit for calculating an output of the detector in accordance with the printed and non-printed region signals and calculating amounts of light transmitted through or reflected by a printed region and a non-printed region of each of the sheets, and a judging circuit for comparing the amounts of light reflected by or transmitted through the printed and plain regions with corresponding different reference signals, the amounts being generated from the integrator circuit, and for judging the sheets as clean or damaged sheets.

16 Claims, 24 Drawing Figures

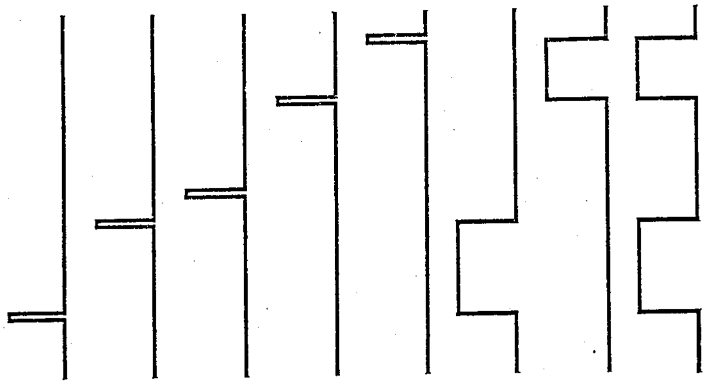
FIG. 7A (V1)
FIG. 7B (V2)
FIG. 7C (V5)
FIG. 7D (V3)
FIG. 7E (V4)
FIG. 7F (Vg)
FIG. 7G (Vgo)
FIG. 7H
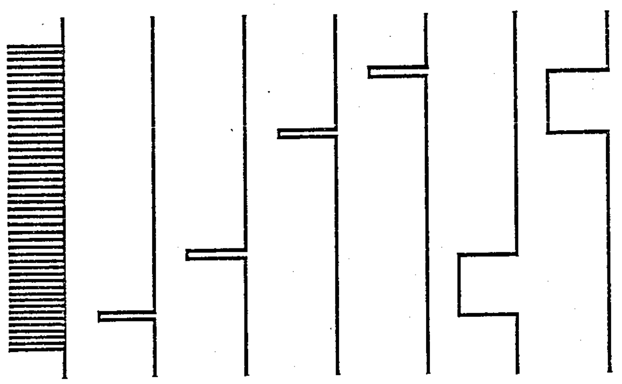
FIG. 6A (CK)
FIG. 6B (H1)
FIG. 6C (H2)
FIG. 6D (H3)
FIG. 6E (H4)
FIG. 6F (Hg1)
FIG. 6G (Hg2)

APPARATUS FOR DISCRIMINATING SHEETS

BACKGROUND OF THE INVENTION

The present invention relates to a sheet discriminating apparatus for detecting the soiling of sheets such as bank notes and classifying the sheets in accordance with the soiling.

In general, when bank notes are soiled to an extent that they cannot be automatically processed by a mechanism, such soiled bank notes are recovered by a national bank or the like which issues bank notes. For this purpose, a bank note discriminating apparatus is installed in each bank branch to classify bank notes into fit notes which can be recirculated since the soiling is below an allowable limit and unfit notes which cannot be recirculated and should be withdrawn because the soiling exceeds the allowable limit. In a conventional note discriminating apparatus, each bank note is conveyed to measure an amount of light transmitted through or reflected by the note and is discriminated as a fit or unfit bank note.

When part of a bank note is subjected to measurement, detection precision varies greatly in accordance with the particular part of the bank note. For example, slight soiling of a white portion can be easily detected but the same soiling of a black portion cannot be detected. For this reason, in order to detect the soiling of bank notes, the soiling of a white portion is detected in accordance with an amount of light transmitted therethrough. However, in the conventional apparatus, the white portion cannot always be subjected to detection. For example when a hole is formed in a bank note, the amount of light transmitted through or reflected by a portion including the hole greatly varies, resulting in an erroneous detection.

Light from a light source irradiates the bank notes to detect the soiling of the bank notes. In this case, deterioration of the light source over time and variation in amount of light emitted therefrom greatly influence judging results.

A threshold value for fit and unfit notes should be determined in accordance with the necessary number of bank notes for circulation and the number of bank notes in actual circulation. The greater the latter number becomes, the more strict the threshold criterion, and the smaller the latter number, the less strict the threshold criterion. In the prior art apparatus, the threshold value is fixed, which does not meet the requirements for actual discrimination.

These drawbacks result in an erroneous detection of the soiling of not only bank notes but also other sheets.

SUMMARY OF THE INVENTION

It is an object of the present invention to provide a sheet discriminating apparatus for accurately detecting the soiling of sheets and classifying them into desired types.

In order to achieve the above object of the present invention, there is provided a sheet discriminating apparatus comprising means for detecting light reflected by or transmitted through a sheet upon irradiation of light onto the sheet, signal generating means for generating a printed region signal and a non-printed region signal according to a type of the sheet, calculating means for calculating an output of said detecting means in accordance with the printed and non-printed region signals and calculating amounts of light transmitted through or reflected by a printed region and a non-printed region of the sheet, and means for comparing the amounts of light reflected by or transmitted through the printed and non-printed regions with corresponding different reference signals, the amounts being generated from said calculating means, and for judging the soiling of the sheet.

BRIEF DESCRIPTION OF THE DRAWINGS

FIGS. 6A to 6G and FIGS. 7A to 7H are timing charts for explaining the operation of the second embodiment of the present invention;

DETAILED DESCRIPTION OF THE PREFERRED EMBODIMENTS

Figure 1:
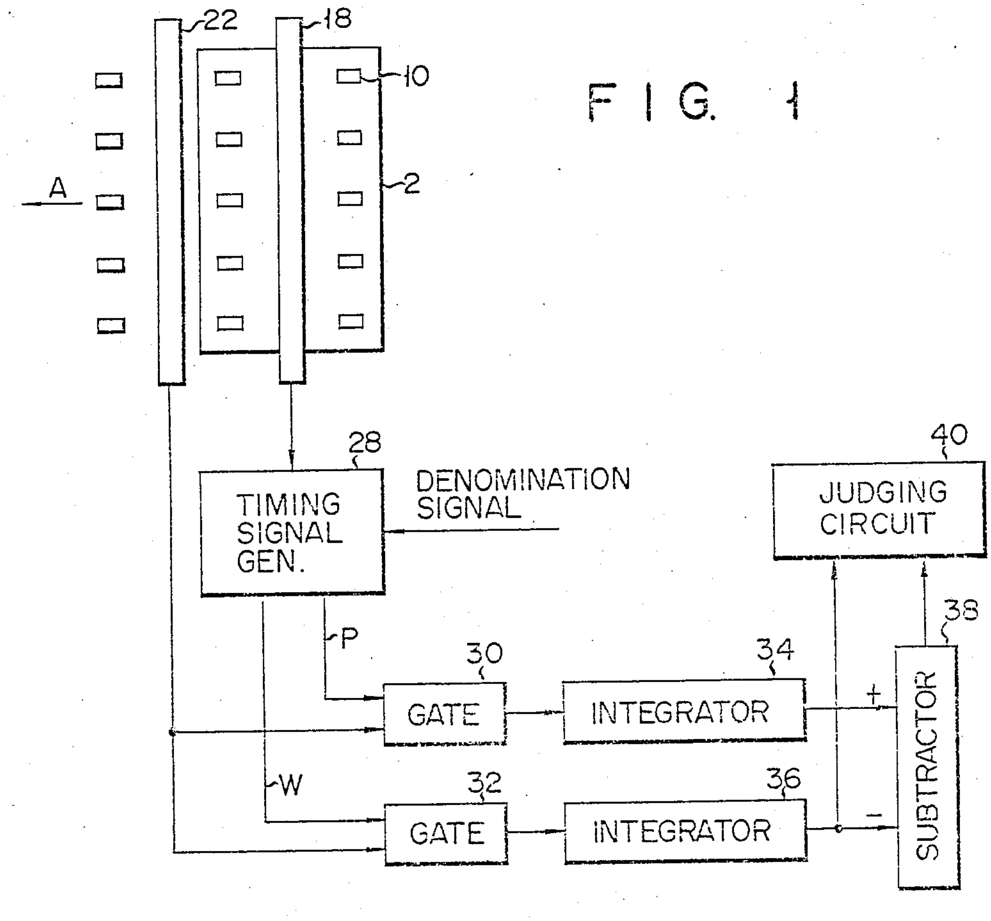
FIG. 1 is a block diagram of a bank note discriminating apparatus used as a sheet discriminating apparatus according to a first embodiment of the present invention.

A bank note discriminating apparatus used as a sheet discriminating apparatus according to a first embodiment will be described with reference to the accompanying drawings. In the description to follow, sheets to be discriminated are bank notes. FIG. 1 is a block diagram of a bank note discriminating apparatus. A bundle of bank notes of an identical denomination are stacked in the input port and are fed by a feeder (not shown) one by one. Here, the obverse or reverse (normally the obverse) of the bank notes are made to face upward. A fed bank note 2 is vertically clamped between convey rollers 10 and is fed in the A direction upon rotation of the rollers 10. The bank note 2 is then subjected to discrimination as a fit/unfit bank note.

Figure 2:
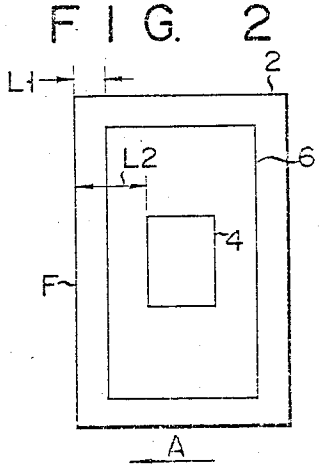
FIG. 2 is a plan view of a bank note to be discriminated in the apparatus shown in FIG. 1.

FIG. 2 is a plan view of a bank note 2 to be discriminated by this apparatus. The bank note 2 comprises a non-printed plain portion (a watermark) 4 and a printed portion 6. The watermark portion 4 is located inside the printed portion 6. The watermark portion 4 may also be located in a peripheral non-printed portion.

Figure 3:
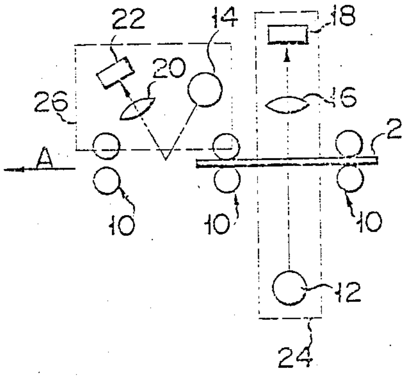
FIG. 3 is a side view showing the vicinity of a detector in the apparatus shown in FIG. 1.

Light sources 12 and 14 are arranged below and above the convey path of the note 2 to illuminate the note 2. The light source 12 is located in front of the light source 14 along the convey direction. The side view of this portion is illustrated in FIG. 3. Each of the light sources 12 and 14 comprises a single fluorescent lamp perpendicular to the convey direction. The fluorescent lamp has a uniform illumination distribution to uniformly illuminate the note 2. A lens 16 and a line sensor (comprising a CCD image sensor array aligned in a direction perpendicular to the convey path) 18 are aligned immediately above the light source 12 through the convey path. Light emitted from the light source 12 and transmitted through the bank note 2 is incident on the line sensor 18 through the lens 16. A lens 20 and a line sensor 22 are arranged in the vicinity of the light source 14 above the convey path. Light emitted from the light source 14 and relected by the upper surface (obverse) of the bank note 2 is incident on the line sensor 22 through the lens 20. The light source 12, the lens 16 and the line sensor 18 constitute a first detector 24, and the light source 14, the lens 20 and the line sensor 22 constitute a second detector 26. Light transmitted through the bank note 2 which is being conveyed is detected by the first detector 24, and light reflected by the upper surface of the bank note 2 is detected by the second detector 26. Detection signals of the CCD elements from one end to the other end of each of the line sensors 18 and 22 are serially generated.

Referring to FIG. 1 again, an output from the first detector 24 (the line sensor 18) is supplied to a timing signal generator 28. An output from the second detector 26 (the line sensor 22) is supplied to gates 30 and 32. The timing signal generator 28 also receives a denomination signal representing the denomination of the bank note 2 being subjected to discrimination. The timing signal generator 28 detects a leading end (F of FIG. 2) of the bank note 2 in accordance with the output from the first detector 24. The bank note 2 has predetermined printed and watermark portions 4 and 6 in accordance with the denomination. When the timing signal generator 28 detects the leading end of the bank note 2, timings at which the printed and watermark portions 6 and 4 come to the detection position of the second detector 26 are estimated in accordance with a time required for conveying the bank note 2 from the detection position of the first detector 24 to the detection position of the second detector 26, the convey speed of the bank note, a distance L1 from the leading end to the printed portion 6, and a distance L2 from the leading end to the watermark portion 4. The printed portion 6 and the watermark portion 4 do not extend along the entire width (direction perpendicular to the convey direction) of the note, but extend within predetermined ranges, so that the timing signal generator 28 generates a printed portion signal and a watermark portion signal in accordance with the width of the printed and watermark portions 6 and 4. More particularly, assume that the line sensor 22 comprises 200 CCD elements. In this case, the timing signal generator 28 generates a printed portion signal P when the printed portion 6 is located in the detection position of the second detector 26 and the detection signals of the central 190 elements of the line sensor are output. The timing signal generator 28 generates a watermark portion signal W when the watermark portion 4 is located in the detection position of the second detector 26 and the detection signals of the central 50 elements of the line sensor 22 are output.

The printed portion signal P and the watermark portion signal W are supplied to the gates 30 and 32, respectively, and the gates 30 and 32 are opened. For this reason, a reflection light signal of the printed portion 6 of the bank note 2 which is detected by the second detector 26 is supplied to an integrator 34 through the gate 30. The reflection light signal of the watermark portion 4 of the bank note 2 which is detected by the second detector 26 is supplied to an integrator 36 through the gate 32. The integrators 34 and 36 calculate an amount of light reflected by the printed portion 6 including the watermark portion 4 and an amount of light reflected by only the watermark portion 4, respectively. Outputs from the integrators 34 and 36 are supplied to a subtractor 38. The subtractor 38 subtracts the output from the integrator 36 from the output from the integrator 34. The subtractor 38 thus calculates the amount, of light reflected only by the printed portion 6.

The outputs from the integrator 36 and the subtractor 38 are supplied to a judging circuit 40. The judging circuit 40 compares the input signals with corresponding different reference signals to discriminate the bank note as a fit/unfit note according to the soiling of the bank note. More particularly, the judging circuit 40 compares the reflection light signal of the watermark portion 4 supplied from the integrator 36 with a relatively strict (low) reference signal. The judging circuit 40 compares the reflection light signal of the printed portion 6 supplied from the subtractor 38 with a relatively moderate (high) reference signal. By using comparison results, a final decision is made.

According to the first embodiment, the amounts of light reflected by the printed portion 6 and the watermark portion 4 are separately obtained and are compared with different reference signals, thereby accurately measuring the soiling of the respective portions and improving sensitivity of overall soiling detection. The watermark and printed portions are detected as portions separated from the leading end of the bank note by predetermined distances and therefore are accurately detected. When the watermark portion is not located inside the printed portion but is located separately from the printed portion, the subtractor 38 can be omitted.

Figure 4:
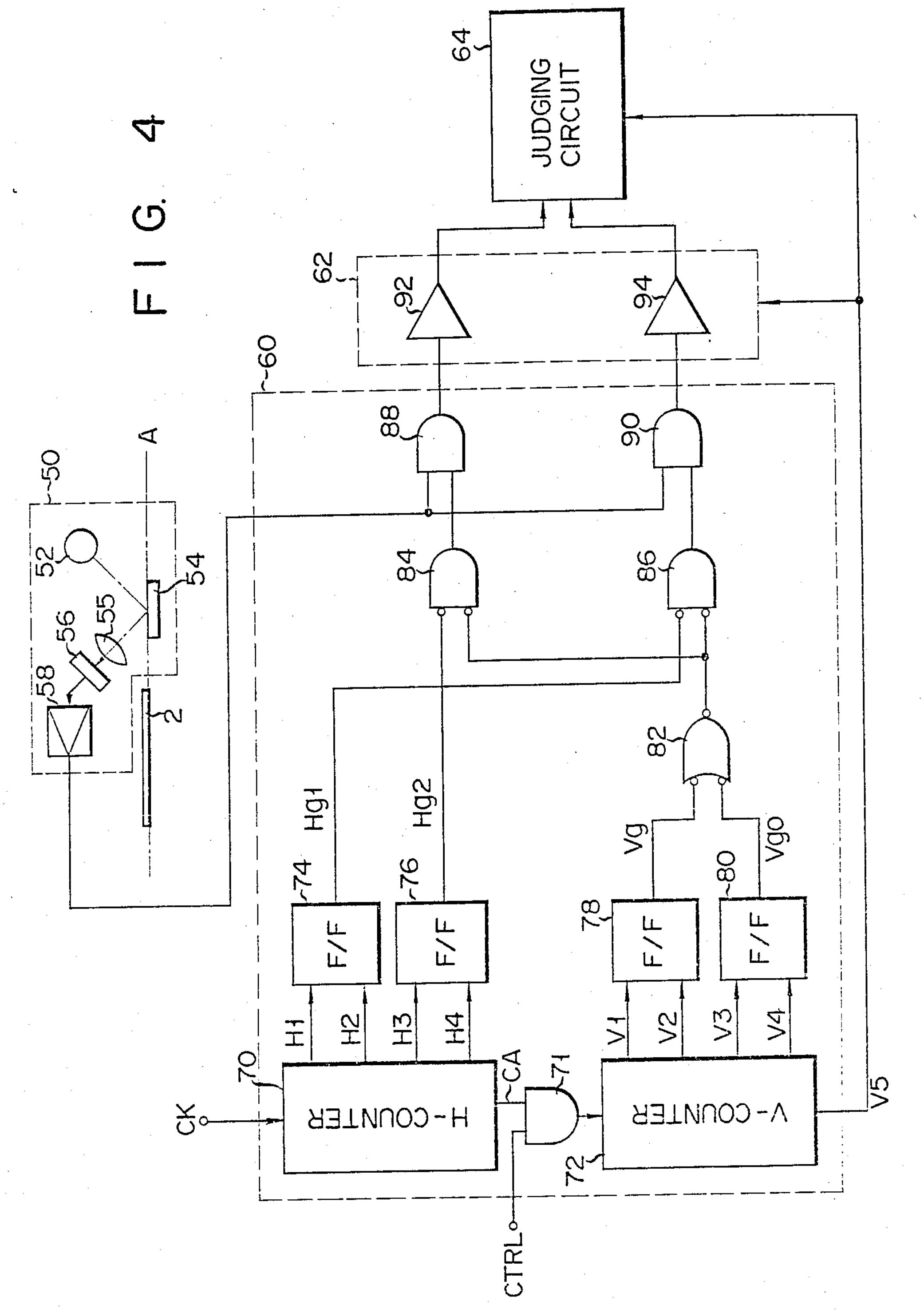
FIG. 4 is a block diagram of a bank note discriminating apparatus according to a second embodiment of the present invention.

A second embodiment of the present invention will be described hereinafter. FIG. 4 is a block diagram of a bank note discriminating apparatus according to the second embodiment. In the first embodiment, the first and second detectors are arranged to detect reflected and transmitted light components. However, in the second embodiment, only a detector 50 is arranged to detect light reflected by the upper surface of the bank note 2 conveyed along a convey path. The detector 50 comprises a light source 52 consisting of a single fluorescent lamp aligned in a direction perpendicular to a convey direction A of the bank note 2, a reflector 54 (e.g., a mirror) having a high reflectance and located below the convey path, a line sensor 56 for receiving light reflected by the reflector 54 and the bank note 2 through a lens 55, and an amplifier 58 connected to an output of the line sensor 56. The line sensor 56 first detects light reflected by the bank note 2 when each bank note conveyed in the A direction is discriminated. The line sensor 56 then detects light (reference reflected light) reflected by the reflector 54. An output from the detector 50 is supplied to a gate & timing signal generator 60 to extract a reflection light signal representing an amount of light reflected by a predetermined portion of the bank note 2 from among the whole output signal of the detector 50. An output from the gate & timing signal generator 60 is supplied to an integrating circuit 62, and an output from the integrating circuit 62 is supplied to a judging circuit 64.

Figure 5:
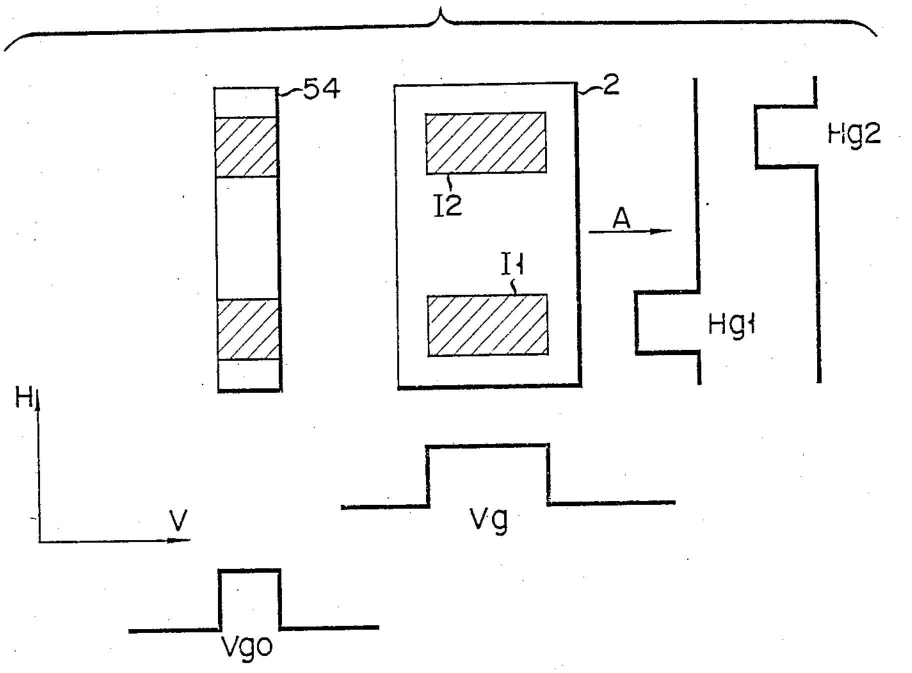
FIG. 5 is a plan view showing the vicinity of a detector in the apparatus shown in FIG. 4.

The gate & timing signal generator 60 comprises an H-counter 70, a V-counter 72, flip-flops (F/Fs) 74, 76, 78 and 80, a NOR gate 82, and AND gates 84, 86, 88 and 90. Meanings of H and V will be described with reference to FIG. 5. FIG. 5 is a plan view showing the vicinity of a detector of the apparatus shown in FIG. 4. As is apparent from FIG. 5, the convey direction of the bank note is defined as the V direction, and a direction perpendicular to the convey direction is defined as the H direction. In this embodiment, the bank note 2 is not divided in accordance with a concept of printed and watermark portions. The bank note 2 is classified into an object region (generally, a watermark portion) I and other portions. In order to extract a reflected light signal for the object region I from among the output from the line sensor 56, gate signals Vg and Hg (Hg1 and Hg2) shown in FIG. 5 are multiplied with the output signal from the line sensor 56. In the first embodiment, bank notes are stacked such that the obverse of the bank notes face upward. In this sense, the watermark position is predetermined. However, in the second embodiment, bank notes may be stacked such that the obverse and reverse face upward in a mixed manner.

When the watermark is not located at the center of the bank note, it may be located in either right and left portions of the note in accordance with whether the obverse or reverse faces upward. In this second embodiment, two gate signals Hg1 and Hg2 are used to extract reflected light signals of the regions I1 and I2 which are symmetrical in the note. When the watermark is located at the center and there is only one object region, no gate signal Hg2 is generated. In the second embodiment, fit/unfit bank note discrimination is based upon a ratio of light reflected by the bank note 2 to light (reference reflected light) reflected by the reflector 54. For this reason, after the leading end of the bank note 2 is detected, gate signals Vg and Vgo are used to extract reflection light signals of the regions I1 and I2 and the reflector 54 from among the output of the detector 50.

Counters for generating the gate signals Hg and Vg comprise the H-counter 70 and the V-counter 72. The H-counter 70 receives the same clock pulse CK as the clock pulse supplied to the line sensor 56. A carry output from the H-counter 70 is supplied as a clock to the V-counter 72 through an AND gate 71. When the leading end of the bank note 2 is detected by the line sensor 56, the AND gate 71 is opened for a predetermined period of time in response to a control signal CTRL. The predetermined period of time is selected to close the AND gate 71 before the next bank note reaches the detection position of the detector 50 in accordance with the pitch between the continuously fed bank notes. The V-counter 72 is reset when the AND gate 71 is closed. When a count of the H-counter 70 has reached the same number as that of the elements of the line sensor 56, the H-counter 70 is reset and generates a carry output CA.

The count of the H-counter 70 represents the order of the detection signal of the CCD element output from the detection circuit 50. When counts of the H-counter 70 are set at h1, h2, h3 and h4 ($h1<h2<h3<h4$), the H-counter 70 generates signals H1, H2, H3 and H4. The signals H1, H2, H3 and H4 are supplied to the set and reset terminals of the F/F 74 and to the set and reset terminals of the F/F 76, respectively. The F/Fs 74 and 76 generate the gate signals Hg1 and Hg2, respectively. When counts of the V-counter 72 are set at v1, v2, v3, v4 and v5 ($v1<v2<v5<v3<v4$), respectively, the V-counter 72 generates signals V1, V2, V3, V4 and V5. The signals V1, V2, V3 and V4 are supplied to the set and reset terminals of the F/F 78, and to the set and reset terminals of the F/F 80, respectively. The F/Fs 78 and 80 generate the gate signals Vg and Vgo.

The output signals Hg1 and Hg2 from the F/Fs 74 and 76 are supplied to the first input terminals of the AND gates 86 and 84, respectively. The output signals Vg and Vgo from the F/Fs 78 and 80 are supplied to the second input terminals of the AND gates 86 and 84 through the NOR gate 82. The outputs from the AND gates 84 and 86 are supplied to the first input terminals of the AND gates 88 and 90, respectively. The output from the detector 50 is also supplied to the second input terminals of the AND gates 88 and 90.

The integrating circuit 62 comprises first and second integrators 92 and 94. The outputs from the AND gates 88 and 90 are supplied to the first and second integrators 92 and 94, respectively. The output signal V5 from the V-counter 72 is supplied as a reset pulse to the integrator 62. The outputs from the first and second integrators 92 and 94 are supplied to the judging circuit 64. The output signal V5 from the V-counter 72 is also supplied as a read pulse to the judging circuit 64.

The operation of the second embodiment will be described hereinafter. When the bank note 2 is conveyed, the line sensor 56 and the H-counter 70 receive the clock pulse CK as shown in FIG. 6A. The outputs from the respective CCD elements of the line sensor 56 are sequentially generated as a serial output. In synchronism with the read operation of the line sensor 56, the H-counter 70 is started. When counts of the H-counter 70 become h1, h2, h3 and h4, the H-counter 70 generates the pulse signals H1, H2, H3 and H4, as shown in FIGS. 6B to 6E, respectively. The counts h1, h2, h3 and h4 are determined in accordance with distances along the H direction between one end of the bank note 2 and the one end of the region I1, between one end of the bank note and the other end of the region I1, between the one end of the bank note and the leading end of the region I2, and between one end of the bank note and the other end of the region I2 and in accordance with the frequency of clock pulse CK. The F/F 74 is set in response to the pulse signal H1 and is reset in response to the pulse signal H2. The F/F 74 generates the pulse signal Hg1 shown in FIG. 6F. The F/F 76 is set in response to the pulse signal H3 and is reset in response to the pulse signal H4. The F/F 76 generates the pulse signal Hg2 shown in FIG. 6G.

The pulse signals Hg1 and Hg2 are generated irrespective of the positions of the bank note 2. In this sense, the bank note must be detected whether or not it is located in the detection position of the detector 50 in response to the output from the V-counter 72. For this reason, even if the pulse signals Hg1 and Hg2 are generated, the AND gates 84 and 86 are closed unless the pulse signals Vg and Vgo are generated. When the line sensor 56 detects the leading end of the bank note 2, the AND gate 71 is opened to start the operation of the V-counter 72. When counts of the V-counter 72 are set to v1, v2, v5, v3 and v4, the V-counter 72 generates the pulse signals V1, V2, V5, V3 and V4, as shown in FIGS. 7A to 7E, respectively. The counts v1 and v2 are determined in accordance with distances along the V direction between one end of the bank note 2 and the one and the other ends of the regions I1 and I2 and in accordance with the convey speed of the bank note 2. The difference between the counts v3 and v4 is determined in accordance with a width of the reflector 54 along the H direction and the convey speed of the bank note 2. For this reason, the F/F 78 generates the pulse signal Vg as shown in FIG. 7F. The F/F 80 is set in response to the pulse signal V3 and is reset in response to the pulse signal V4. The F/F 80 generates the pulse signal Vgo shown in FIG. 7G. As a result, the NOR gate 82 generates the pulse signal shown in FIG. 7H.

The AND gates 84 and 86 and then the AND gates 88 and 90 are opened when the regions I1 and I2 of the bank note 2 are located at the detection position of the detector 50 and for a predetermined period of time after the regions I1 and I2 are located in the detection position of the detector 50. The integrators 92 and 94 calculate amounts of light reflected by the object regions I1 and I2 in the bank note 2 and portions of the reflector 54 which are located in the same positions as the object regions I1 and I2 along the H direction. In this case, when the object region is a watermark portion, a larger amount of light reflected by the right or left object region is regarded as being from the true object region. The soiling of the bank note is detected in accordance with a ratio of the amount of light reflected from the object region (true) to that reflected from the corresponding region of the reflector 54, thereby discriminating the bank note as a fit/unfit note.

According to the second embodiment, the reflectance at a given position of the bank note is compared with that of the corresponding portion of the reference reflector along the widthwise direction (the direction perpendicular to the convey direction). Under this condition, even if the illumination light distribution of the light source is not uniform, or the amount of light emitted from the light source is locally degraded due to deterioration over time, the discrimination precision will not be influenced. Furthermore, even if the bank note is deviated in the direction perpendicular to the convey direction during conveyance, the corresponding region of the reference reflector is also deviated, thereby accurately detecting the soiling.

Figure 8:
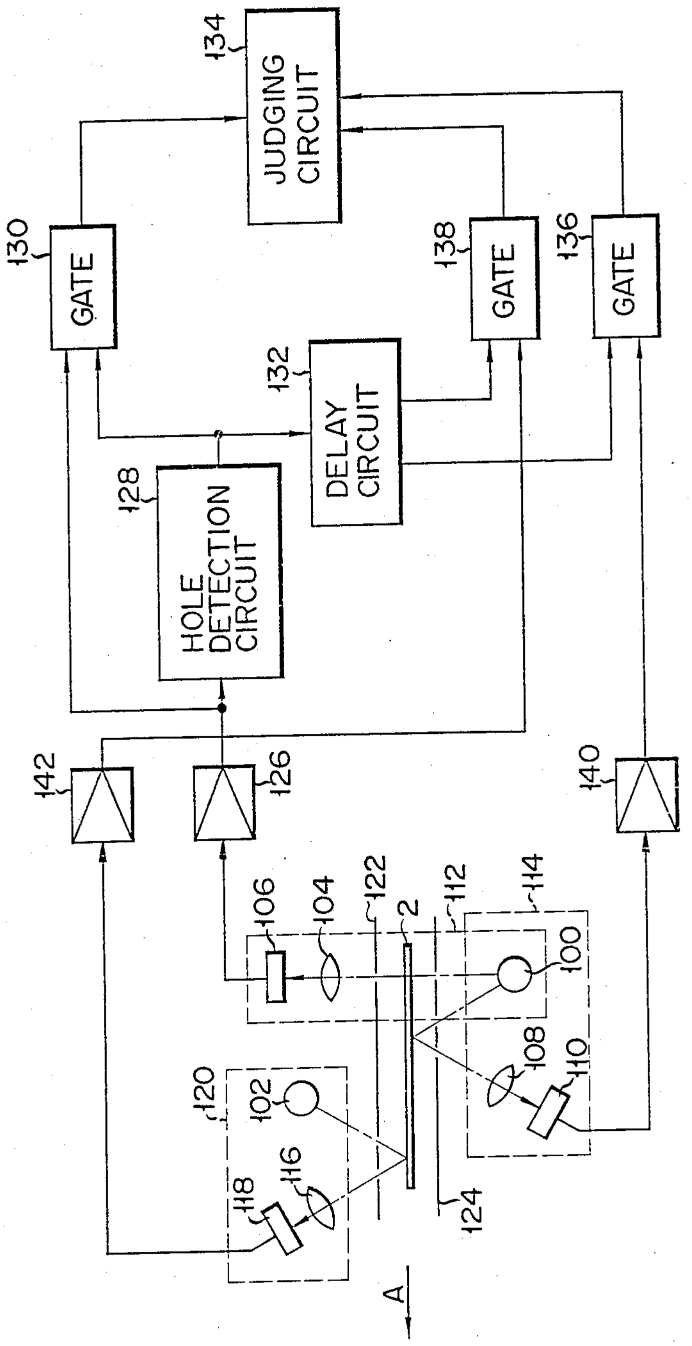
FIG. 8 is a block diagram of a bank note discriminating apparatus according to a third embodiment of the present invention.

A third embodiment of the present invention will be described hereinafter. FIG. 8 is a block diagram of the third embodiment according to the present invention. The third embodiment has three detectors. Light sources 100 and 102 are arranged below and above the convey path along the convey direction. The light source 100 is located in front of the light source 102 along the convey direction. A lens 104 and a line sensor 106 are arranged immediately above the light source 100 through the convey path. Light emitted from the light source 100 and transmitted through the bank note 2 is incident on the line sensor 106 through the lens 104. A lens 108 and a line sensor 110 are also arranged in the vicinity of the light source 100 below the convey path. Light emitted from the light source 102 and reflected by the bank note 2 is incident on the line sensor 110 through the lens 108. The light source 100, the lens 104 and the line sensor 106 constitute a first detector 112. The light source 100, the lens 108 and the line sensor 110 constitute a second detector 114. A lens 116 and a line sensor 118 are arranged in the vicinity of the light source 102 above the convey path. Light emitted from the light source 102 and reflected by the bank note 2 is incident on the line sensor 118 through the lens 116. The light source 102, the lens 116 and the line sensor 118 constitute a third detector 120. Background plates 122 and 124 which have alternate black and white standard color stripes sandwich the convey path.

Figure 9:
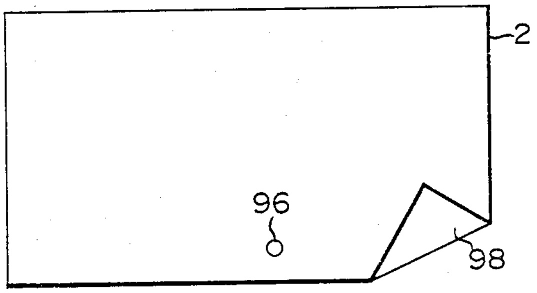
FIG. 9 is a plan view showing a bank note to be discriminated by the apparatus shown in FIG. 8.

An output from the first detector 112 is supplied to a hole detection circuit 128 through an amplifier 126. In this embodiment, even if a hole 96 or a folded portion 98 is present in the bank note 2, as shown in FIG. 9, erroneous operation caused by a large change in amount of light reflected by or transmitted through the bank note can be prevented. The hole detection circuit 128 detects the presence/absence of a hole (including a folded portion) in accordance with the amount of light transmitted through the bank note 2. A hole detection signal is supplied to a gate 130 and a delay circuit 132. The gate 130 also receives an output from the amplifier 126, so that the gate 130 is closed in response to the hole detection signal. An output from the gate 130 is supplied to a judging circuit 134. The delay circuit 132 delays the hole detection signal by the time duration for conveying the bank note from the detection position of the first detector 112 to the detection position of the second detector 114. A delayed signal is then supplied to a gate 136, thereby closing the gate 136. The hole detection signal is also delayed by the time duration for conveying the bank note from the detection position of the first detector 112 to the detection position of the third detector 120. The resultant delayed signal is supplied to a gate 138, thereby closing the gate 138. The gates 136 and 138 also receive output signals from the second and third detectors 114 and 120 through amplifiers 140 and 142. Outputs from the gates 136 and 138 are also supplied to the judging circuit 134.

The operation of the third embodiment will be described hereinafter. A case will first be explained wherein no hole and folded portion are formed in a bank note. In this case, the gates 130, 136 and 138 are not closed. The outputs (i.e., the transmission signal, the signal representing the light reflected from the lower side of the conveyed note, and the signal representing the light reflected from the upper side of the conveyed note) from the first, second and third detectors 112, 114 and 120 are supplied to the judging circuit 134. The judging circuit 134 compares these signals with different reference signals, respectively. In accordance with the comparison results, the bank note is detected as a fit/unfit note.

However, when a hole or a folded portion is formed in the bank note, an output from the first detector 112 is abnormally increased. Upon detection of this abnormal signal from the first detector 112, the hole detecting circuit 128 generates a hole detection signal. The gate 130 is immediately closed. When the bank note is then moved to the detection position of the second detector 114, the gate 136 is closed. When the bank note is finally moved to the detection position of the third detector 120, the gate 138 is closed. The time interval for closing the gates corresponds to the generation time of the hole detection signal. As a result, a signal representing a portion including the hole or the folded portion among the outputs from the first, second and third detectors 112, 114 and 120 will not be supplied to the judging circuit 134. In other words, the soiling of the bank note is detected in accordance with the reflected light signal excluding a signal component representing an abnormally high transmittance.

According to the third embodiment as described above, a hole need not be considered in soiling detection. Therefore, a bank note discriminating apparatus can be obtained to accurately discriminate a fit note from an unfit note.

Figure 10:
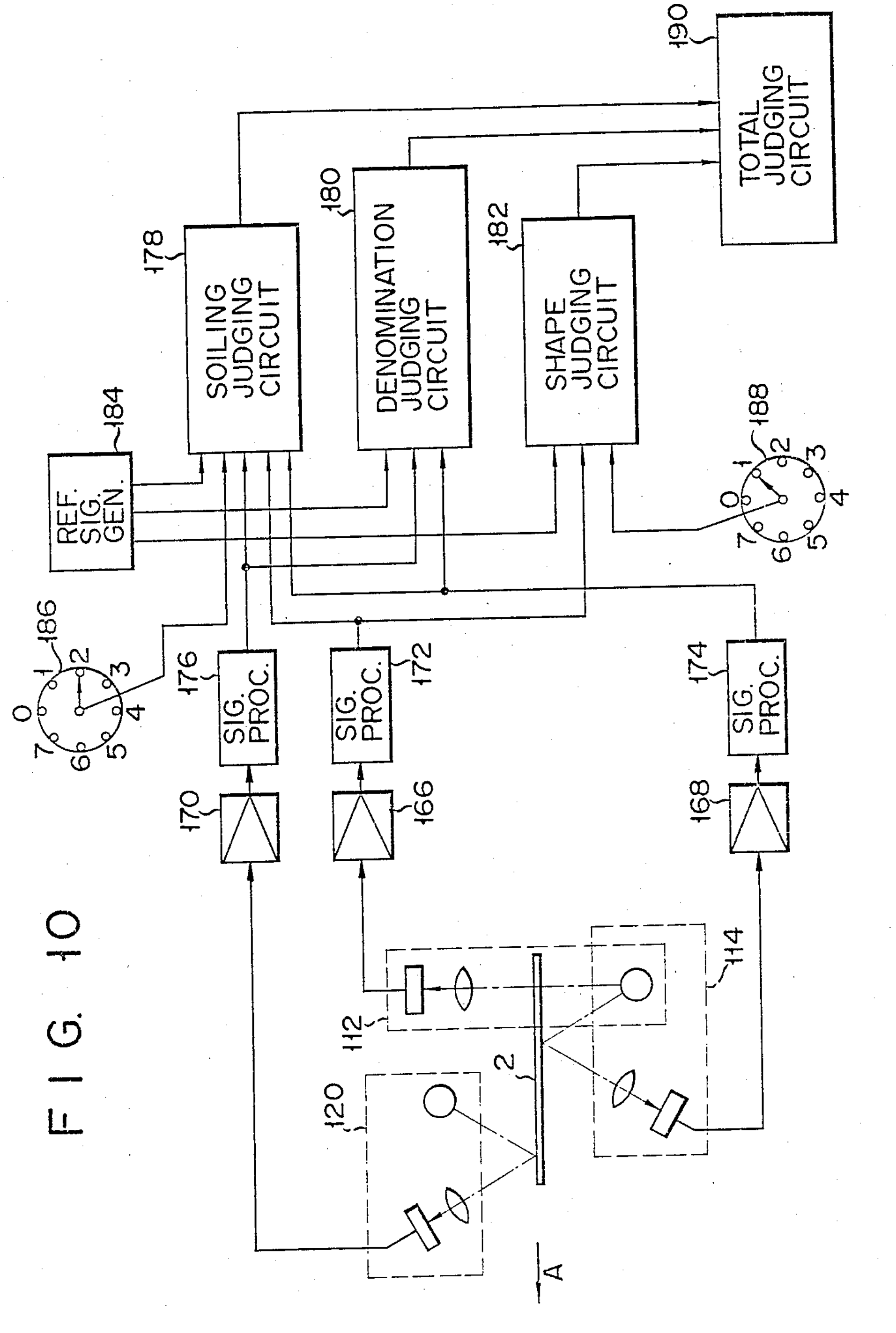
FIG. 10 is a block diagram of a bank note discriminating apparatus according to a fourth embodiment of the present invention.

A fourth embodiment of the present invention will be described with reference to FIG. 10. The apparatus of this embodiment has first, second and third detectors 112, 114 and 120 which are provided along the convey direction of the convey path in the same manner as in the third embodiment. Outputs from the first, second and third detectors 112, 114 and 120 are supplied to signal processors 172, 174 and 176 through amplifiers 166, 168 and 170, respectively. Outputs from the signal processors 172, 174 and 176 are also supplied to a soiling judging circuit 178. The outputs from the signal processors 174 and 176 are also supplied to a denomination judging circuit 180. The output from the signal processor 172 is supplied to a shape judging circuit 182. Output terminals of a reference signal generator 184 for generating a plurality of judging reference signals are connected to the soiling judging circuit 178, the denomination judging circuit 180 and the shape judging circuit 182. Selectors 186 and 188 are respectively connected to the soiling judging circuit 178 and the shape judging circuit 182, respectively, to select desired reference signals therefor. Outputs from the soiling judging circuit 178, the denomination judging circuit 180 and the shape judging circuit 182 are supplied to a total judging circuit 190.

The operation of the fourth embodiment will be described hereinafter. Light transmitted from the lower side to the upper side of the bank note, light reflected by the lower side of the bank note, and light reflected by the upper side of the bank note are detected by the first, second and third detectors 112, 114 and 120, respectively. Output signals from the detectors 112, 114 and 120 are amplified by the amplifiers 166, 168 and 170, respectively. The amplified signals are processed by the signal processors 172, 174 and 176 in accordance with predetermined techniques. The outputs from the signal processors 172, 174 and 176 are discriminated by the soiling judging circuit 178, the denomination judging circuit 180 and the shape judging circuit 182. Soiling includes discoloration in addition to simple soiling. Shape discrimination is performed to detect the presence/absence of a folded edge portion or a hole. These two judging standards are not absolute but relative. For this reason, in the fourth embodiment, a plurality of reference signals are supplied to the soiling judging circuit 178 and the shape judging circuit 182 and are selected by the selectors 186 and 188. As a result, judging standards can be arbitrarily changed in accordance with the number of circulating bank notes, etc., thereby performing discrimination of fit notes from unfit notes at a desired threshold value.

Figure 11:
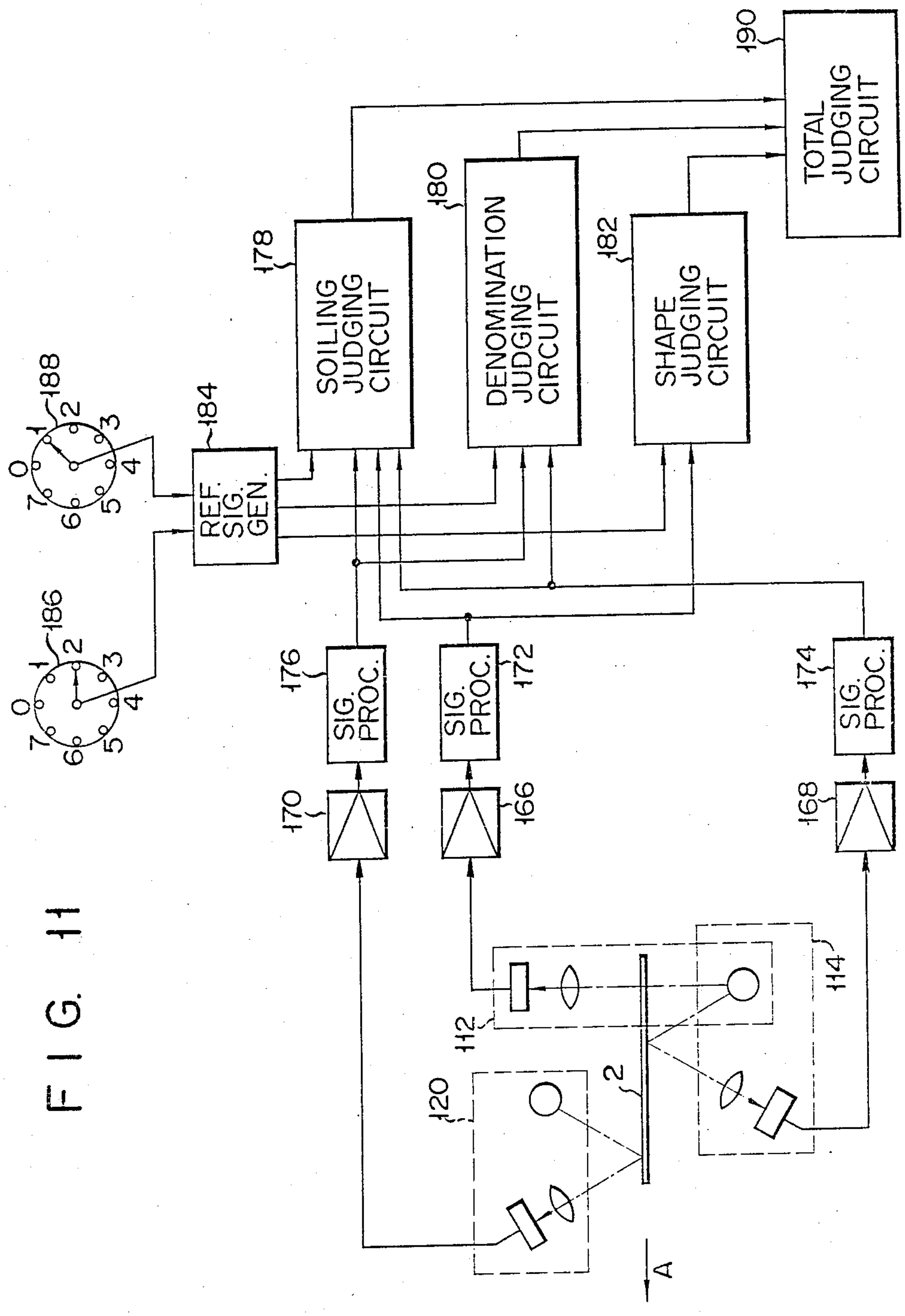
FIG. 11 is a block diagram showing a modification of the fourth embodiment.

In the fourth embodiment, the selectors 186 and 188 are connected to the judging circuits 178 and 182, respectively. Each selector selects one of a plurality of reference signals supplied to the corresponding judging circuit. However, as shown in FIG. 11 illustrating a modification of the fourth embodiment, the selectors 186 and 188 may also be connected to the reference signal generator 184 to supply the selected one of the reference signals to the judging circuits 178 and 182.

The present invention is not limited to the particular embodiments described above. Various changes and modifications may be made within the spirit and scope of the invention. The bank notes are stacked such that the obverses face upward in the first embodiment. However, as described with reference to the second embodiment, the bank notes need not be stacked in the manner of the first embodiment if two regions are given as detection regions. In addition, the reflected light detector and the transmission light detector arrangements need not be as in the above embodiments, for there can be other arrangements. Furthermore, the above embodiments may be combined. Finally, in the above description, the sheet is exemplified by a bank note but is not limited to this, for a sheet discriminating apparatus can be obtained wherein soiling of the sheet is accurately detected.

What is claimed is:

1. An apparatus for detecting the degree of soiling of a sheet, comprising:

means for detecting light having interacted with an entire region of the sheet upon irradiation of the light onto the sheet;

signal generating means for generating a non-printed region signal which identifies portions of the sheet which are non-printed regions according to a type of the sheet;

calculating means for calculating an output of said detecting means in accordance with the non-printed region signal and calculating an amount of light having interacted with the non-printed regions of the sheet; and means for comparing the amount of light having interacted with the non-printed regions with non-printed region reference signals, and for judging the soiling of the sheet from the output of said comparing means.

2. An apparatus according to claim 1, in which said signal generating means further generates a printed region signal which identifies portions of the sheet which are printed regions according to the type of the sheet, said calculating means further calculating an output of said detecting means in accordance with the printed region signal and calculating an amount of light having interacted with the printed regions of the sheet, and wherein said comparing means further compares the amount of light having interacted with the printed regions with printed region reference signals.

3. An apparatus according to claim 2, in which said signal generating means generates the printed and non-printed region signals and stores them in accordance with the type of sheet.

4. An apparatus according to claim 2, in which said signal generating means generates the printed and non-printed region signals of an output from said detecting means by discriminating the printed regions from the non-printed regions.

5. An apparatus according to claim 2, in which said signal generating means generates the printed and non-printed region signals in synchronism with an output from said detecting means, said calculating means comprising gate means, which are opened or closed in response to the output from said signal generating means, and means for integrating an output from said gate means.

6. An apparatus according to claim 2, in which said detecting means comprises a linear light source parallel to one edge of the sheet, a reflector arranged at the same plane as that of the sheet for reflecting light from said light source, and a photosensor element array for receiving light reflected by the sheet and said reflector, and in which said judging means judges the soiling of the sheet in accordance with a ratio of light reflected by a portion of the sheet to light reflected by a corresponding portion of said reflector.

7. An apparatus according to claim 2, in which said signal generating means detects a hole in the sheet in accordance with an output from said detecting means, said calculating means comprising gate means which receives an output from said detecting means and which is opened or closed in response to the output from said signal generating means, said gate means being closed to stop transmitting an output component of the output from said detecting means which corresponds to the hole, and means for integrating an output from said gate means.

8. An apparatus according to claim 2, in which said judging means comprises selecting means for selecting said printed and non-printed region reference signals, wherein an output from said calculating means is compared with one of the reference signals which is selected by said selecting means.

9. An apparatus according to claim 2, in which the sheet comprises a bank note.

10. An apparatus according to claim 1, in which said signal generating means generates printed and non-printed region signals and stores them in accordance with the type of sheet.

11. An apparatus according to claim 1, in which said signal generating means generates printed and non-printed region signals from an output of said detecting means by discriminating the printed regions from the non-printed regions.

12. An apparatus according to claim 1, in which said signal generating means generates printed and non-printed region signals in synchronism with an output from said detecting means, said calculating means comprising gate means, which are opened or closed in response to the output from said signal generating means, and means for integrating an output from said gate means.

13. An apparatus according to claim 1, in which said detecting means comprises a linear light source parallel to one edge of the sheet, a reflector arranged at the same plane as that of the sheet for reflecting light from said light source, and a photosensor element array for receiving light reflected by the sheet and said reflector, and in which said judging means judges the soiling of the sheet in accordance with a ratio of light reflected by a portion of the sheet to light reflected by a corresponding portion of said reflector.

14. An apparatus according to claim 1, in which said signal generating means detects a hole in the sheet in accordance with an output from said detecting means, said calculating means comprising gate means which receives an output from said detecting means and which is opened or closed in response to the output from said signal generating means, said gate means being closed to stop transmitting an output component of the output from said detecting means which corresponds to the hole, and means for integrating an output from said gate means.

15. An apparatus according to claim 1, in which said judging means comprises selecting means for selecting printed region reference signals and said non-printed region reference signals, wherein an output from said calculating means is compared with one of the reference signals which is selected by said selecting means.

16. An apparatus according to claim 1, in which the sheet comprises a bank note.

* * * * *